USo11397396B2

(12) United States Patent
Akazawa

(10) Patent No.: US 11,397,396 B2
(45) Date of Patent: Jul. 26, 2022

(54) IMAGE FORMING APPARATUS CAPABLE OF PERFORMING WIRELESS COMMUNICATION WITH MOBILE TERMINAL

(71) Applicant: CANON KABUSHIKI KAISHA, Tokyo (JP)

(72) Inventor: Minoru Akazawa, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/024,866

(22) Filed: Sep. 18, 2020

(65) Prior Publication Data

US 2021/0080885 A1 Mar. 18, 2021

(30) Foreign Application Priority Data

Sep. 18, 2019 (JP) .............................. JP2019-169171

(51) Int. Cl.
| G03G 15/00 | (2006.01) |
| H04W 4/80 | (2018.01) |
| G03G 21/16 | (2006.01) |
| H04N 1/00 | (2006.01) |

(52) U.S. Cl.
CPC ..... *G03G 15/5004* (2013.01); *G03G 15/5075* (2013.01); *G03G 21/1657* (2013.01); *H04N 1/00342* (2013.01); *H04N 1/00891* (2013.01); *H04W 4/80* (2018.02); *G03G 2215/00088* (2013.01); *G03G 2215/00611* (2013.01); *H04N 2201/006* (2013.01); *H04N 2201/0075* (2013.01); *H04N 2201/0094* (2013.01)

(58) Field of Classification Search
CPC .......... G03G 15/5004; G03G 15/5075; G03G 21/1657; G03G 2215/00611; G03G 2215/00088; H04N 1/00342; H04N 1/00891; H04N 2201/0094; H04N 2201/0075; H04N 2201/006; H04W 4/80
See application file for complete search history.

(56) References Cited

U.S. PATENT DOCUMENTS

2016/0216671 A1* 7/2016 Baba ...................... G03G 15/55

FOREIGN PATENT DOCUMENTS

| JP | 2015205500 A | * | 11/2015 |
| JP | 2015-231155 A | | 12/2015 |
| JP | 2016126732 A | * | 7/2016 |

* cited by examiner

*Primary Examiner* — Ryan D Walsh
(74) *Attorney, Agent, or Firm* — Venable LLP

(57) ABSTRACT

Disclosed is an image forming apparatus that includes: a detecting unit configured to detect a user approaching the image forming apparatus; a communication unit configured to be capable of receiving the job from a mobile terminal via short-range wireless communication; and a controlling unit that controls a power supply such that electric power is supplied from the power supply to a first device and a second device in response to detection of the user by the detecting unit, and controls the power supply such that in response to designation of a job from the mobile terminal via the short-range wireless communication, the power supply continues supply of the electric power to the first device that is used for executing the designated job and the power supply stops supply of the electric power to the second device that is not used for executing the designated job.

11 Claims, 10 Drawing Sheets

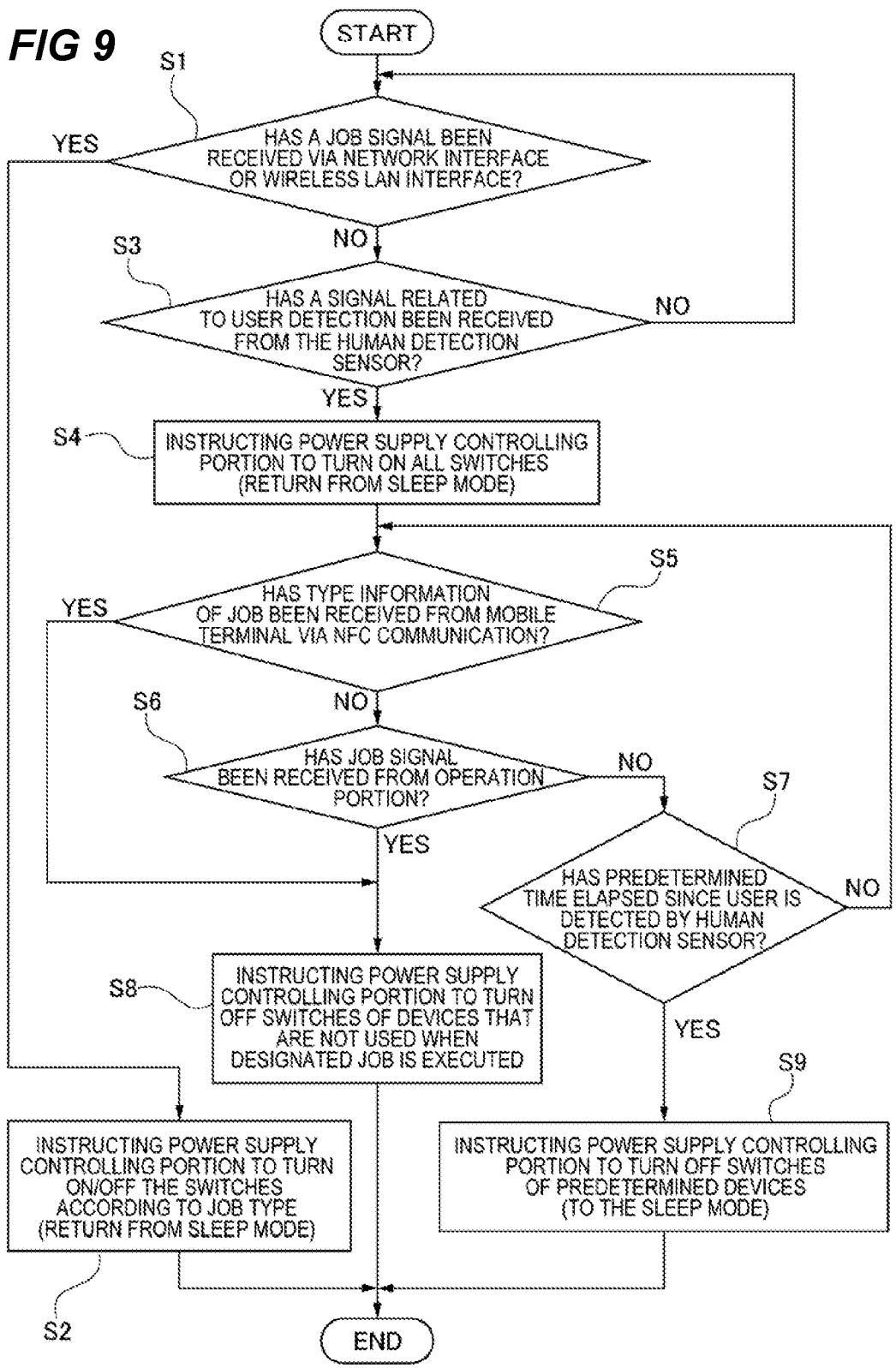

IMAGE FORMING APPARATUS CAPABLE OF PERFORMING WIRELESS COMMUNICATION WITH MOBILE TERMINAL

BACKGROUND OF THE INVENTION

Field of the Invention

The present invention relates to an image forming apparatus such as an electrophotographic copying machine and an electrophotographic printer (for example, laser beam printer, LED printer).

Description of the Related Art

The configuration of an image forming apparatus is known in which a job is designated from a mobile terminal such as a smartphone of a user via wireless communication, and the image forming apparatus executes the designated job. Japanese Patent Application Laid-Open No. 2015-231155 discloses the configuration, in which information for performing wireless LAN communication is transmitted from an image forming apparatus to a mobile terminal by NFC communication to establish wireless LAN communication, and a job for the image forming apparatus is designated from the mobile terminal via wireless LAN communication.

Japanese Patent Application Laid-Open No. 2015-231155 also discloses the configuration in which, when a job is designated by the mobile terminal via wireless LAN communication while the image forming apparatus is in a sleep mode, power is supplied to only the devices that are used when the job is executed. Namely, with the configuration in which the power is not supplied to the device that is not used when a job is designated in the sleep mode, it is possible to suppress the power consumption during the execution of the job.

Further, the configuration of an image forming apparatus is known in which power is supplied to the devices for the image forming apparatus to return from the sleep mode when a user approaching the image forming apparatus is detected by a human detection sensor. When the user is detected by the human detection sensor, it is unknown what kind of job the user will designate. Therefore, when returning from the sleep mode, power is supplied to many devices and the image forming apparatus becomes in a standby state for waiting the job designated by a user.

On the other hand, when NFC communication is performed between the mobile terminal and the image forming apparatus as in the configuration described in Japanese Patent Application Laid-Open 2015-231155, the image forming apparatus returns from the sleep mode after a user approaching the image forming apparatus for the performing of the NFC communication is detected by the human detection sensor. Therefore, at the stage when the user designates a job from the mobile terminal via the wireless LAN communication, power may be supplied to not only the device used at the time of executing the job but also the unused device. In this case, when the job is executed, unnecessary power may be consumed by the device that is not used when the job is executed.

SUMMARY OF THE INVENTION

A representative configuration of the present invention is an image forming apparatus configured to form an image on a recording medium based on a job input to the image forming apparatus, the image forming apparatus comprising:
a detecting unit configured to detect a user approaching the image forming apparatus;
a communication unit configured to be capable of receiving the job from a mobile terminal via short-range wireless communication; and
a controlling unit configured to control a power supply that supplies electric power to a first device and a second device,
wherein the controlling unit controls the power supply such that electric power is supplied from the power supply to the first device and the second device in response to a detection of the user by the detecting unit, and
wherein the controlling unit controls the power supply such that, in response to designation of a job from the mobile terminal via the short-range wireless communication, the power supply continues supply of the electric power to the first device that is used for executing the designated job and the power supply stops supply of the electric power to the second device that is not used for executing the designated job.

Further features of the present invention will become apparent from the following description of exemplary embodiments with reference to the attached drawings.

BRIEF DESCRIPTION OF THE DRAWINGS

FIG. 9 is a flowchart of a return sequence.

DESCRIPTION OF THE EMBODIMENTS

First Embodiment

<Image Forming Apparatus>

Hereinafter, the overall configuration of the image forming apparatus according to the first embodiment of the present invention will be described with reference to the drawings together with the operation during image formation. The dimensions, materials, shapes, relative arrangements, and the like of the components described below are not intended to limit the scope of the present invention to these unless otherwise specified.

The image forming apparatus A according to the present embodiment is of an intermediate tandem type in which toners of four colors of yellow Y, magenta M, cyan C, and black K are transferred to an intermediate transfer belt, and then the image is transferred to a sheet to form an image. In the following description, Y, M, C, and K are added as subscripts to the members that use the toners of the respective colors, but the configurations and operations of the members are same except that the colors of the toners used are different. Since the members are substantially the same, the subscripts will be omitted as appropriate unless distinction is required.

Figure 1:
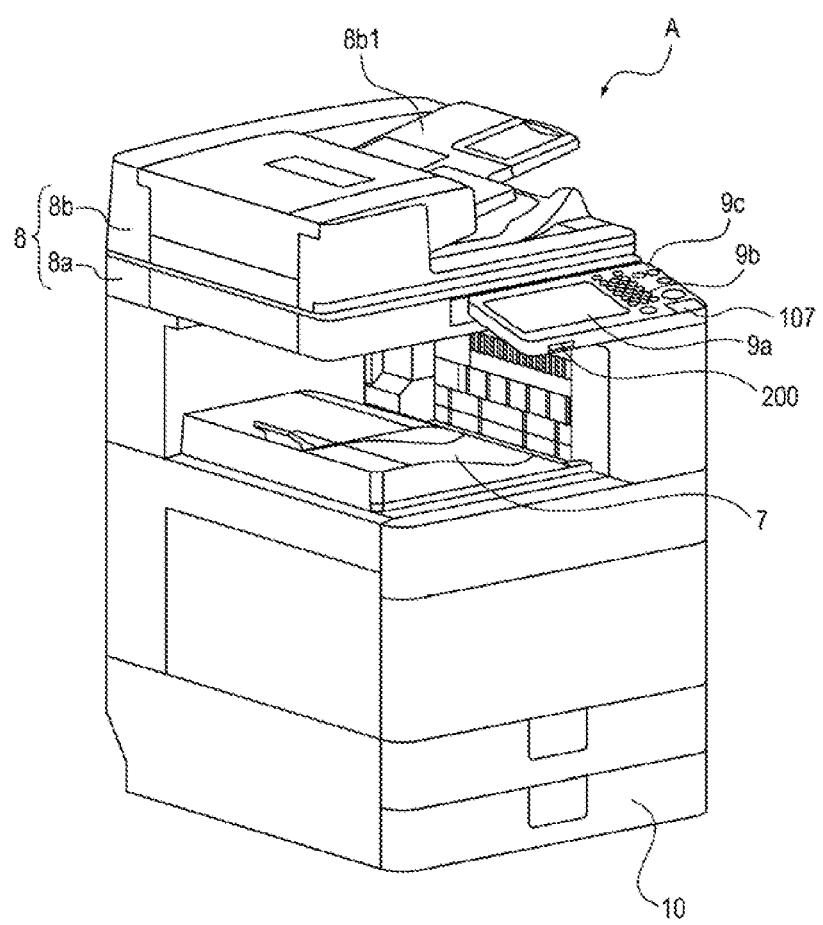
FIG. 1 is a schematic perspective view of an image forming apparatus.
Figure 2:
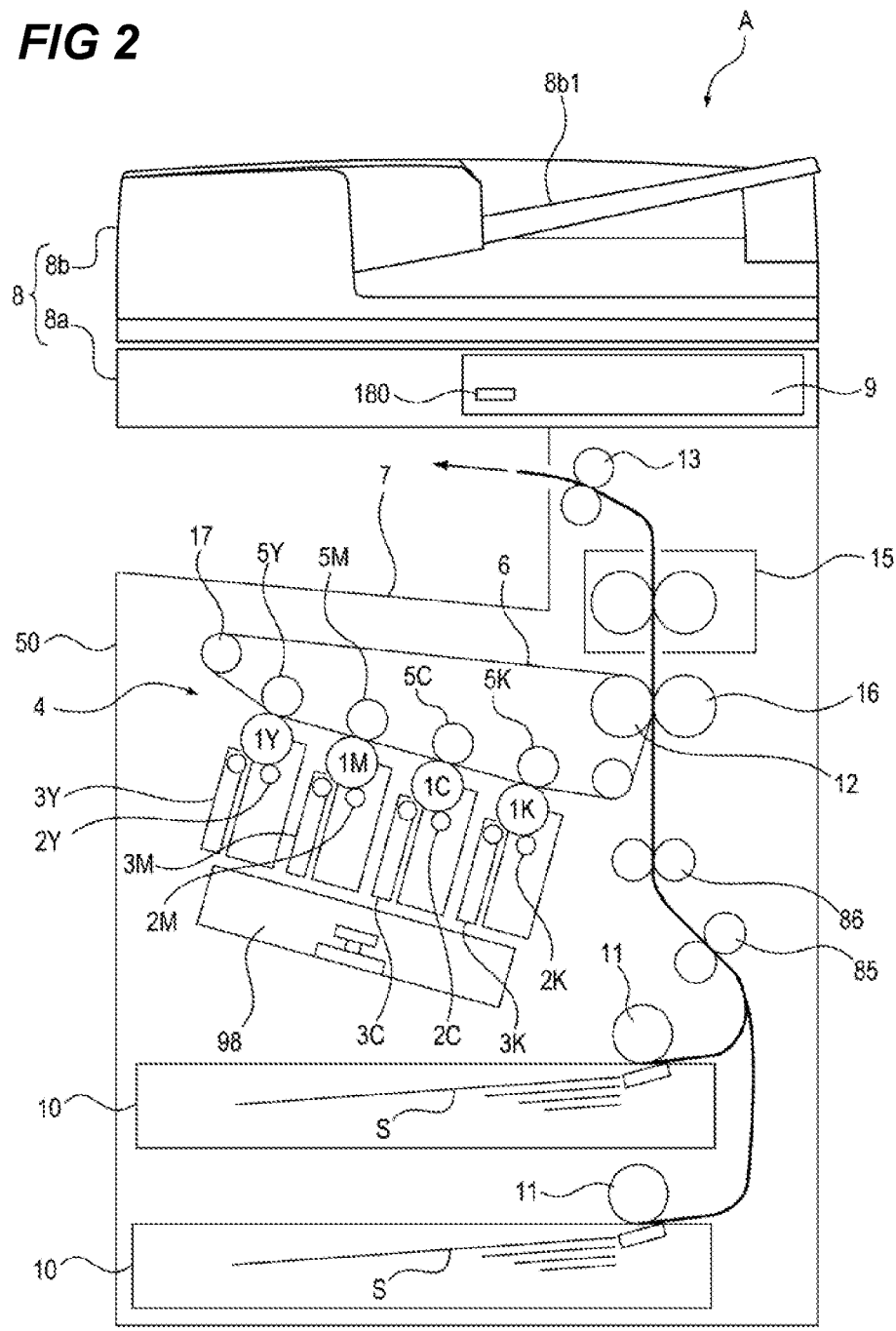
FIG. 2 is a schematic sectional view of an image forming apparatus.

FIG. 1 is a schematic perspective view of the image forming apparatus A. FIG. 2 is a schematic sectional view of the image forming apparatus A. As shown in FIGS. 1 and 2, the image forming apparatus A includes the image forming unit 4 that forms an image on the sheet S. The image forming unit 4 includes the photosensitive drums 1 (1Y, 1M, 1C, and 1K), the charging rollers 2 (2Y, 2M, 2C, and 2K), and the developing devices 3 (3Y, 3M, 3C, and 3K). The image forming unit 4 also includes the primary transfer rollers 5 (5Y, 5M, 5C, and 5K), the laser scanner unit 98, the intermediate transfer belt 6, the secondary transfer roller 16, the secondary transfer counter roller 12, and the like.

The image forming apparatus A also includes the image reading unit 8 that reads an image on a document. The image reading unit 8 is composed of the reader 8a and the ADF (Automatic Document Feeder) 8b. The reader 8a optically reads an image on a document placed on a placing table (not shown) formed of a glass plate and converts the image into image data. The ADF 8b automatically conveys documents stacked on the document tray 8b1 for reading an image. The ADF 8b is rotatably supported, and the placing table of the reader 8a can be accessed by opening the ADF 8b by rotating it upward.

Further, on the front side of the image forming apparatus A, provided is the operation portion 9 for making settings related to image formation and image reading. The operation portion 9 has the display portion 9a for displaying information, the keys 9b for inputting numerical values and the like, and the exterior cover 9c. A user can make settings for image formation such as the size of the sheet S relating to image forming and the number of sheets on which an image is formed, and setting for image reading such as the size of a document by operating the keys 9b to input numerical values.

Further, the NFC (Near Field Communication) tag 107 (communication unit, first communication unit) is provided at a position adjacent to the operation portion 9 in the image forming apparatus A. The NFC tag 107 includes an antenna (not shown) that transmits and receives radio waves and an IC chip (not shown) that controls NFC communication. The NFC tag 107 performs NFC communication as short-range wireless communication between a mobile terminal such as a smartphone or a tablet terminal of a user and the NFC tag 107. It should be noted that the "mobile terminal" mentioned here includes not only a smartphone but also a wearable terminal such as a wristwatch-type electronic device and an eyeglass-type electronic device that can be worn. NFC is defined by non-contact wireless communication standard using electromagnetic waves of 13.56 MHz.

Further, the image forming apparatus A is provided with the human detection sensor 180 (detecting unit) that detects a user approaching the apparatus. The human detection sensor 180 is arranged inside the slit 200 formed on the exterior cover 9c of the operation portion 9. The human detection sensor 180 detects a user by transmitting an ultrasonic wave through the slit 200, and by receiving the reflected wave. The detailed configuration of the human detection sensor 180 will be described later.

Next, the image forming operation by the image forming apparatus A will be described. When forming an image, an image forming job signal is first input to the CPU 101 shown in FIG. 3. As a result, the feeding roller 11 and the conveying roller 85 rotate, and the sheet S stacked and stored in the sheet cassette 10 are conveyed to the registration roller 86. Next, the sheet S is conveyed by the registration roller 86 at a predetermined timing to the secondary transfer portion comprised of the secondary transfer roller 16 and the secondary transfer counter roller 12.

On the other hand, in the image forming unit 4, the surface of the photosensitive drum 1Y is first charged by the charging roller 2Y. After that, the laser scanner unit 98 irradiates the surface of the photosensitive drum 1Y with laser light in accordance with the image signal of the image of a document read by the image reading unit 8 and the like, thereby forming an electrostatic latent image on the surface of the photosensitive drum 1Y. Then, yellow toner is attached to the electrostatic latent image formed on the surface of the photosensitive drum 1Y by the developing device 3Y thereby forming a yellow toner image on the surface of the photosensitive drum 1Y. The toner image formed on the surface of the photosensitive drum 1Y is primarily transferred to the intermediate transfer belt 6 by applying a primary transfer bias to the primary transfer roller 5Y.

By the same process, magenta, cyan, and black toner images are also formed on the photosensitive drums 1M, 1C, and 1K, respectively. Then, by applying a primary transfer bias to the primary transfer rollers 5M, 5C, and 5K, these toner images are superposedly transferred onto the yellow toner image on the intermediate transfer belt 6. As a result, a full-color toner image corresponding to the image signal is formed on the surface of the intermediate transfer belt 6.

Thereafter, the full-color toner image is conveyed to the secondary transfer portion while the intermediate transfer belt 6 rotates by the driving force being transmitted from the driving roller 17 to the intermediate transfer belt 6. Then, the full-color toner image on the intermediate transfer belt 6 is transferred to the sheet S by applying a secondary transfer bias to the secondary transfer roller 16 at the secondary transfer portion.

Next, the sheet S on which the toner image is transferred is heated and pressurized by the fixing device 15, whereby the toner image on the sheet S is fixed to the sheet S. After that, the sheet S on which the toner image is fixed is discharged to the discharge unit 7 by the discharge roller 13.

[Controlling Portion]

Next, the system configuration of the image forming apparatus A will be described.

Figure 3:
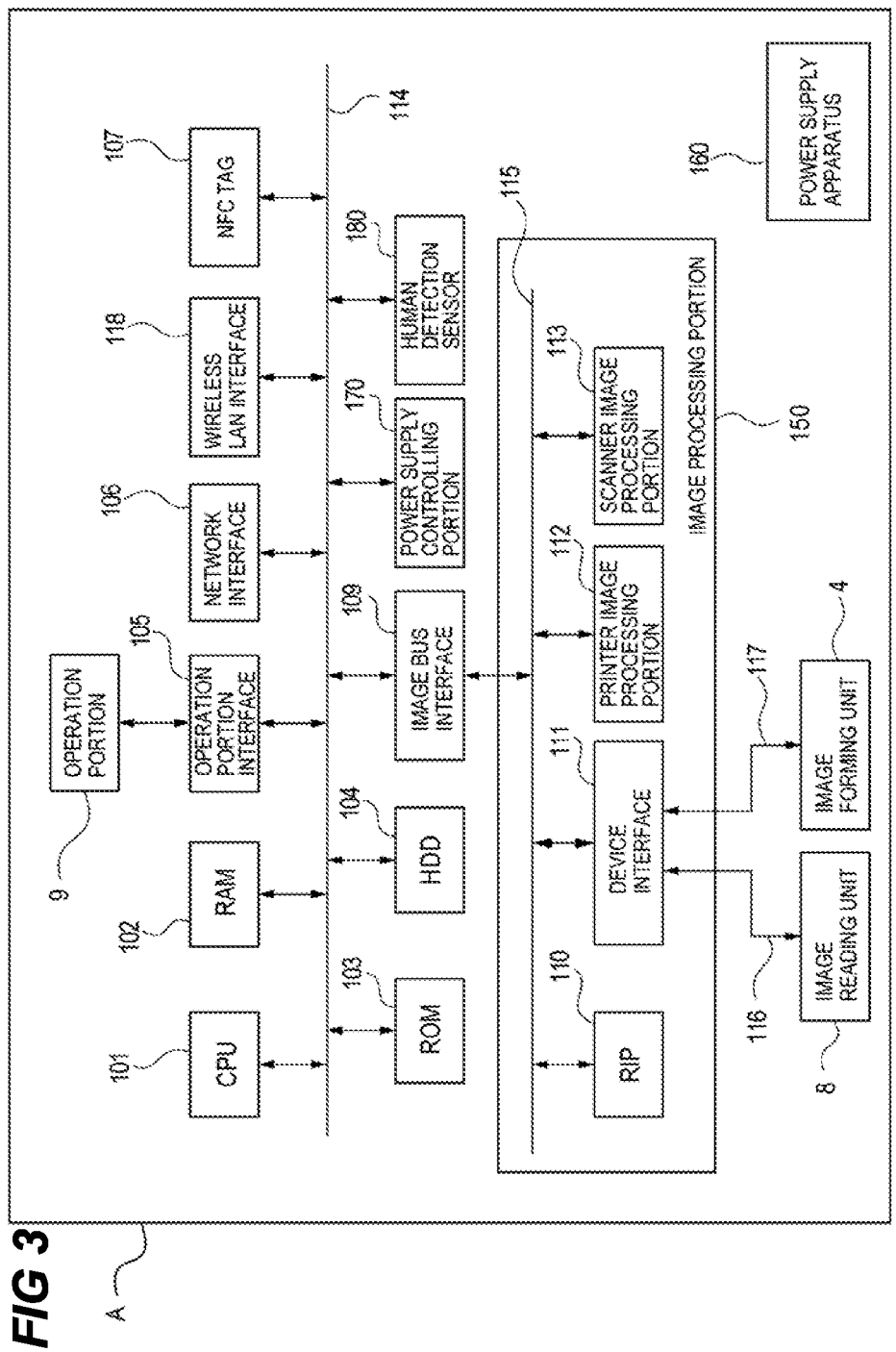
FIG. 3 is a block diagram showing a system configuration of an image forming apparatus.

FIG. 3 is a block diagram showing the system configuration of the image forming apparatus A. As shown in FIG. 3, the image forming apparatus A includes the CPU 101 (controlling unit), the RAM 102 for temporarily storing data used by the CPU 101 for calculation, and the ROM 103 for storing various programs. The image forming apparatus A also includes the HDD 104 in which a software related to control of the image forming apparatus A, various settings, and saved documents are stored.

The image forming apparatus A also includes the network interface 106 that transmits/receives data to/from an external device via a LAN, and the wireless LAN interface 118 (second communication unit) that transmits/receives data to/from an external device via wireless LAN communication. In addition, the image forming apparatus A also includes the operation portion interface 105 for relaying data input by using the keys 9b of the operation portion 9 and image data to be displayed on the display portion 9a. It should be noted that the wireless LAN communication in this description refers to communication having a wider communication range than NFC communication. The wireless LAN communication includes Wi-Fi communication. The wireless LAN communication has a faster communication speed than that of the NFC communication.

The image forming apparatus A also includes the power supply controlling portion 170 that receives an instruction from the CPU 101 and switches between the supplying of power to the specific devices and the stoppage of the supplying of power to the specific devices. The power supply controlling portion 170 controls the power supply apparatus 160 which receives power from a commercial power supply, converts the power into power used by each device, and supplies the power to each device. Details of the configuration of the power supply controlling portion 170 will be described later. The devices described above, the NFC tag 107, and the human detection sensor 180 are connected to each other via the system bus 114.

The image forming apparatus A also includes the image processing portion 150 that performs image processing. The image processing unit 150 includes the RIP (Raster Image Processor) 110, the device interface 111, the printer image processing portion 112, and the scanner image processing portion 113, which are connected to each other via the image bus 115. The image bus 115 and the system bus 114 are connected via the image bus interface 109 which relays the image bus 115 and the system bus 114 and converts the data structure.

The RIP 110 converts page description language (PDL) codes and a display list into a bitmap image. The scanner image processing portion 113 performs image processing such as data correction and resolution conversion to the image data read by the image reading unit 8. The printer image processing portion 112 performs image processing such as data correction and resolution conversion to the image data of the image formed by the image forming unit 4.

The image reading unit 8 is connected to the image bus 115 via the scanner bus 116 and the device interface 111. The image forming unit 4 is connected to the image bus 115 via the print bus 117 and the device interface 111. The device interface 111 adjusts the timing of transmitting to the image bus 115 the image data received from the image reading unit 8 and the timing of transmitting the image data from the image bus 115 to the image forming unit 4.

<Human Detection Sensor>

Next, a detailed configuration of the human detection sensor 180 will be described.

Figure 4:
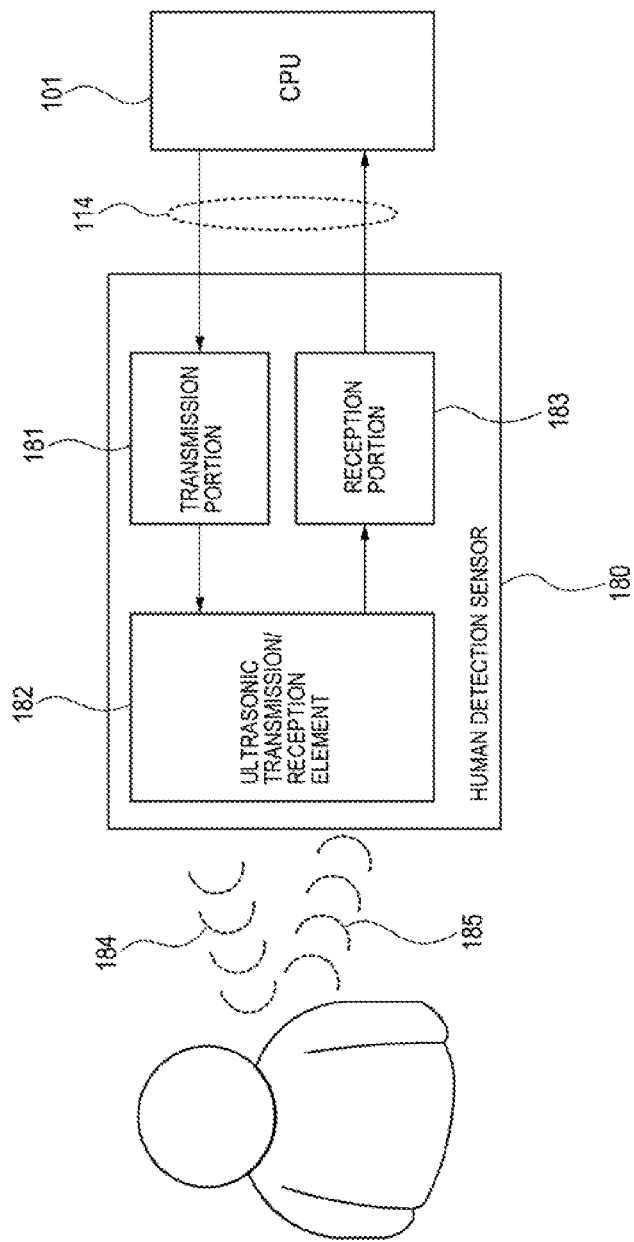
FIG. 4 is a block diagram showing the configuration of a human detection sensor.

FIG. 4 is a block diagram showing the configuration of the human detection sensor 180. As shown in FIG. 4, the human detection sensor 180 includes the transmission portion 181, the reception portion 183, and the ultrasonic transmission/reception element 182. The ultrasonic transmission/reception element 182 converts an electric signal into an ultrasonic wave to transmit it, and receives an ultrasonic wave and converts it into an electric signal.

The transmission portion 181 receives from the CPU 101 a digital signal for controlling ultrasonic transmission and converts the digital signal into an analog signal for ultrasonic transmission of the ultrasonic transmission/reception element 182. When the ultrasonic transmission/reception element 182 receives an electric signal for ultrasonic transmission from the transmission portion 181, the ultrasonic transmission/reception element 182 oscillates and transmits ultrasonic waves. The ultrasonic transmission wave 184 transmitted from the ultrasonic transmission/reception element 182 is reflected when hitting an object such as a human body. The ultrasonic wave transmitting/receiving element 182 receives the reflected ultrasonic wave 185 and inputs it to the receiving unit 183 as an analog electric signal.

The reception unit 183 converts the analog electric signal of the received ultrasonic wave into a digital signal and outputs the digital signal to the CPU 101 via the system bus 114. The CPU 101 measures the time period from the time when a signal for controlling ultrasonic wave transmission is transmitted to the transmission portion 181 to the time when the reception portion 183 receives the reception signal of the reflected ultrasonic wave 185. Then, the CPU 101 detects the movement of the approaching or the moving away of an object causing the reflected wave 185 based on the dynamic change of this time period.

<Power Controlling Portion>

Next, the detailed configuration of the power supply controlling portion 170 will be described.

Figure 5:
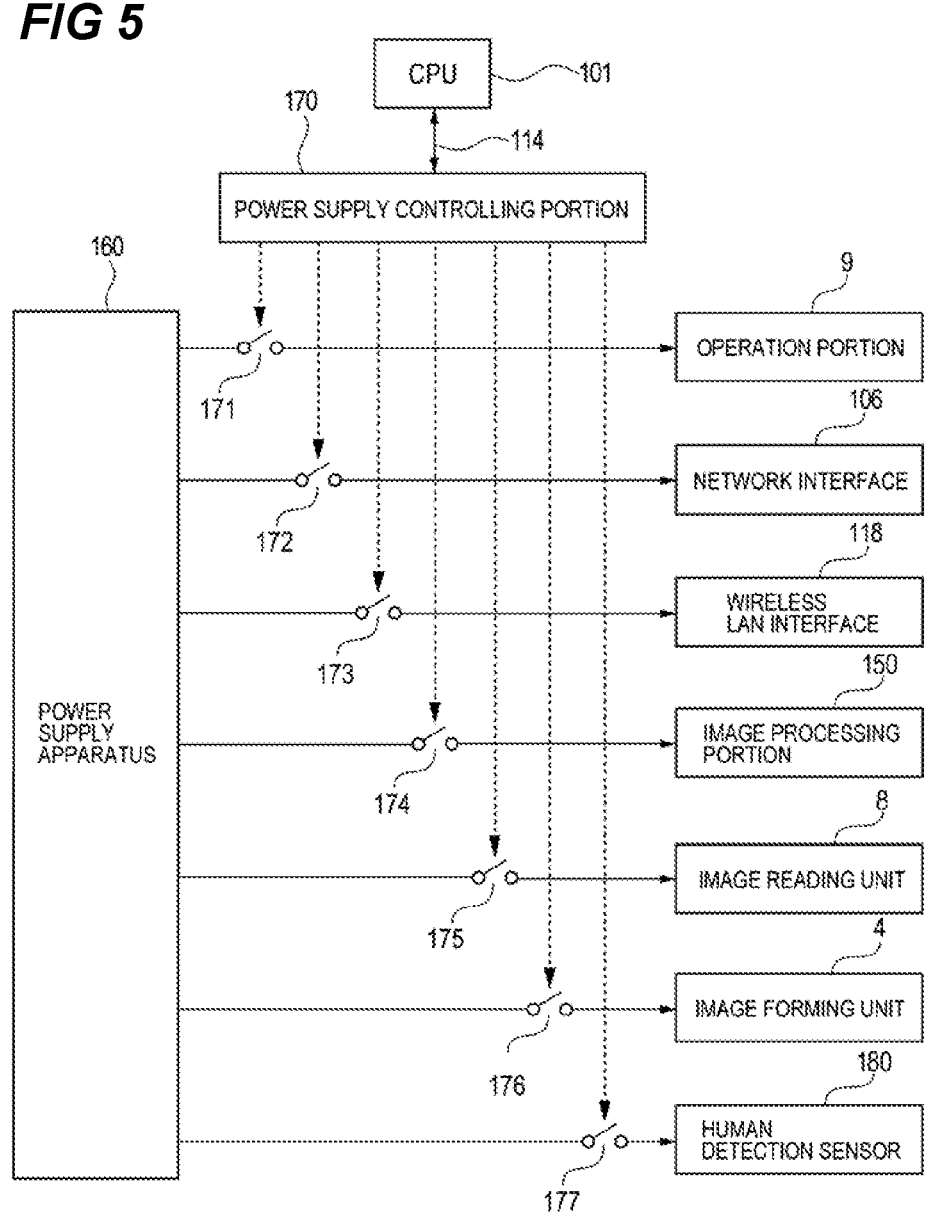
FIG. 5 is a block diagram showing the configuration of a power supply controlling portion.

FIG. 5 is a block diagram showing the configuration of the power supply controlling portion 170. As shown in FIG. 5, upon receiving an instruction from the CPU 101, the power supply controlling portion 170 turns on/off the switches 171 to 177 to control the supply of power and stoppage of the supply of power from the power supply apparatus 160 to each device. Specifically, the power supply controlling portion 170 controls the supply of power and the stoppage of the supply of power to the operation portion 9, the network interface 106, the wireless LAN interface 118, the image processing portion 150, the image reading unit 8, the image forming unit 4, and the human detection sensor 180.

When the image forming apparatus A is not used for a certain period of time, or when a user selects a sleep mode by operating the operation portion 9, the image forming apparatus A enters the sleep mode for the purpose of power saving. In the sleep mode, the power supply controlling portion 170 turns on the switches 172, 173, and 177 and turns off the switches 171, 174, 175, and 176. As a result, the driving of the operation portion 9, the image processing portion 150, the image forming unit 4, and the image reading unit 8 is stopped.

Even in the sleep mode, power is supplied to the CPU 101 from the power supply apparatus 160. Therefore, even in the sleep mode, the CPU 101 can instruct the power supply controlling portion 170 to turn on/off each switch.

When an image forming job is designated via the network interface 106 in the state where the image forming apparatus A is in the sleep mode, the power supply controlling portion 170 turns on the switches 174 and 176 after receiving the instruction from the CPU 101. The same operation is performed when an image forming job is designated via the wireless LAN interface 118. As a result, power is supplied to the image processing portion 150 and the image forming unit 4 that are used when executing an image forming job.

When an image reading job is designated via the network interface 106 in the state where the image forming apparatus A is in the sleep mode, the power supply controlling portion 170 turns on the switches 174 and 175 after receiving the instruction from the CPU 101. The same operation is performed when an image reading job is designated via the wireless LAN interface 118. As a result, power is supplied to the image processing portion 150 and the image reading unit 8 that are used when executing an image reading job.

As described above, when a job is designated from the network interface 106 or the wireless LAN interface 118 in the sleep mode, the CPU 101 controls the supply of power so that the power is supplied only to the devices used when executing the job. That is, the CPU 101 turn on from the OFF state the switches corresponding to the devices used to execute the designated job. Accordingly, power is supplied only to the devices that are used, and power is not supplied to the devices that are not used, so that it is possible to suppress power consumption when a job of the image forming apparatus A is executed.

More specifically, when an image forming job is designated via the wireless LAN interface 118, the CPU 101 receives a job signal. The CPU 101 controls the power supply controlling portion 170 based on this signal.

Further, when a user approaching the image forming apparatus A is detected by the human detection sensor 180 in the state where the image forming apparatus A is in the sleep mode, the power supply controlling portion 170 turns on the switches 171, 174, 175, and 176 after receiving the instruction from the CPU 101. Specifically, the human detection sensor 180 generates a detection signal in response to the detection of the user. Based on this signal, the CPU 101 instructs the power supply controlling portion 170 to turn on/off each switch. Namely, when a user is detected by the human detection sensor 180, all the switches 171 to 177 become in ON state so that all the devices are in the standby state because a job to be specified by the user detected by the human sensor 180 is unknown. This configuration is adopted to improve convenience of a user.

<Mobile Terminal>

Next, the configuration of the mobile terminal 300 used to designate a job for the image forming apparatus A will be described.

Figure 6:
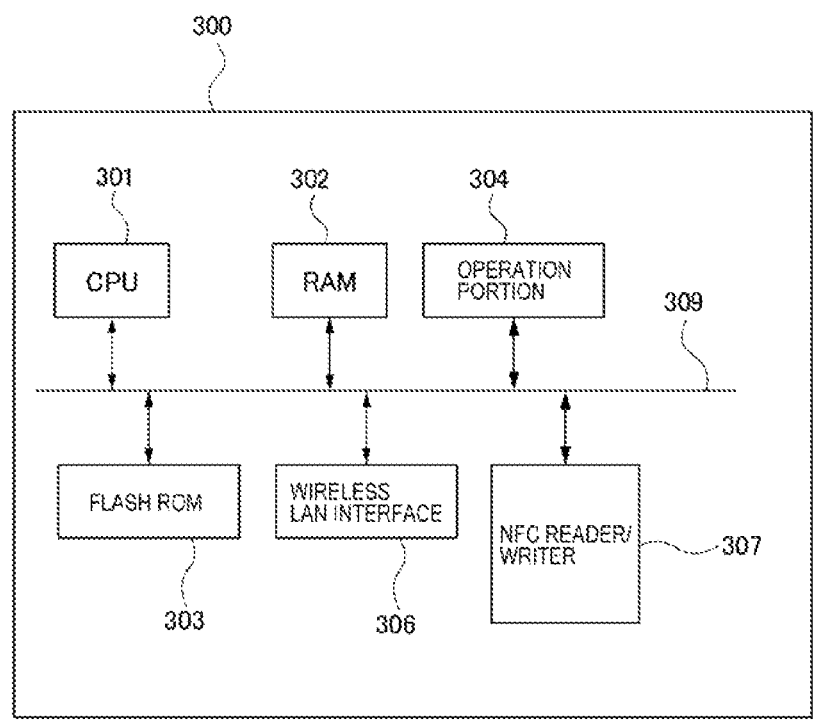
FIG. 6 is a block diagram showing the configuration of a mobile terminal.

FIG. 6 is a block diagram showing the configuration of the mobile terminal 300. As shown in FIG. 6, the mobile terminal 300 includes the CPU 301, the RAM 302 in which data used by the CPU 301 for calculation are temporarily stored, and the flash ROM 303 in which programs and various data used by the CPU 301 are stored.

The mobile terminal 300 also includes the wireless LAN interface 306 that transmits/receives data to/from an external device via wireless LAN communication. The mobile terminal 300 also includes the NFC reader/writer 307 that has an antenna (not shown) for transmitting and receiving radio waves and that performs NFC communication with an external device.

Further, the mobile terminal 300 includes the operation portion 304 of a touch panel type for displaying various information according to an instruction from the CPU 301 and for inputting various information to the CPU 301 by an operation of a user. The above-mentioned devices are mutually connected by the system bus 309 so that data are mutually transmitted and received.

Next, how a job for the image forming apparatus A is designated from the mobile terminal 300 by wireless communication will be described. FIGS. 7A to 7F are diagrams showing display screens of a software application (hereinafter, referred to as "MFP (Multi-Function Printer) link application") used when a job for the image forming apparatus A is designated from the mobile terminal 300. The MFP link application is installed in the mobile terminal 300 and runs when a user operates the operation portion 304.

When the MFP link application is started, the job selection screen 701 (FIG. 7A) is displayed on the operation portion 304 of the mobile terminal 300. The print button 701a for designating an image forming job and a scan button 701b for designating an image reading job are displayed on the job selection screen 701. The case where an image forming job is designated will be described below.

When a user presses the print button 701a on the job selection screen 701, the job setting screen 702 (FIG. 7B) is displayed on the operation portion 304. When a user operates the setting buttons 702a on the job setting screen 702, the selection of an image to be formed in the image forming job and the settings such as the number of images to be formed, the size of the sheet S, and the selection of duplex printing or simplex printing are performed.

Next, when a user presses the execute button 702b on the job setting screen 702, the communication waiting screen 703 (FIG. 7C) is displayed on the operation portion 304. On the communication waiting screen 703, a message for guiding a user to hold the mobile terminal 300 over the NFC tag 107 of the image forming apparatus A is displayed.

The user approaches the image forming apparatus A and holds the mobile terminal 300 over the NFC tag 107 according to the guidance on the communication waiting screen 703. As a result, NFC communication is started between the NFC reader/writer 307 of the mobile terminal 300 and the NFC tag 107 of the image forming apparatus A. At this time, the communication screen 704 (FIG. 7D) with a message indicating that the NFC communication is in progress is displayed on the operation portion 304 of the mobile terminal 300.

Next, the NFC communication and the wireless LAN communication described later are performed between the image forming apparatus A and the mobile terminal 300. In the communication, the mobile terminal 300 transmits job type information (an image forming job in this case) designated by a user, image data, setting information, and the like to the image forming apparatus A. After the transmission is completed, the image forming apparatus A executes the job designated in the job type information received from the mobile terminal 300. That is, the time when the transmission of the job from the mobile terminal 300 to the image forming apparatus A is completed is the time when the job is designated. In the present embodiment, the time when the screen of the mobile terminal 300 transitions from "NFC COMMUNICATION IN PROGRESS" to "PRINT JOB IN PROGRESS" is the time when the job is designated. As an image forming job is designated here, the image forming apparatus A forms an image based on the image data and the setting information received from the mobile terminal 300. In this way, the image forming unit 4 automatically starts the image formation on the sheet in response to the designation of a job. As the image forming unit A automatically starts image formation on a sheet only by a user holding the mobile terminal 300 over the image forming apparatus A, the user can perform a smooth operation without stress. While the image forming apparatus A executes the job, the job-in-progress screen 705 (FIG. 7E) is displayed on the operation portion 304 of the mobile terminal 300.

When a communication error occurs due to the fact that the NFC tag 107 and the mobile terminal 300 become distant from each other during the NFC communication, the communication error screen 706 (FIG. 7F) is displayed on the operation portion 304 of the mobile terminal 300. A message prompting the user to hold the mobile terminal 300 over the NFC tag 107 again is displayed on the communication error screen 706. Further, although the case where the print button 701a is pressed has been described above, the similar operation is performed when the scan button 701b is pressed.

<Wireless Communication>

Next, details of the wireless communication performed between the image forming apparatus A and the mobile terminal 300 when a job is designated by using the above-described MFP link application will be described with reference to FIG. 8. Wireless LAN communication is established between the image forming apparatus A and the mobile terminal 300 via the NFC communication using the Static Handover method.

Figure 8:
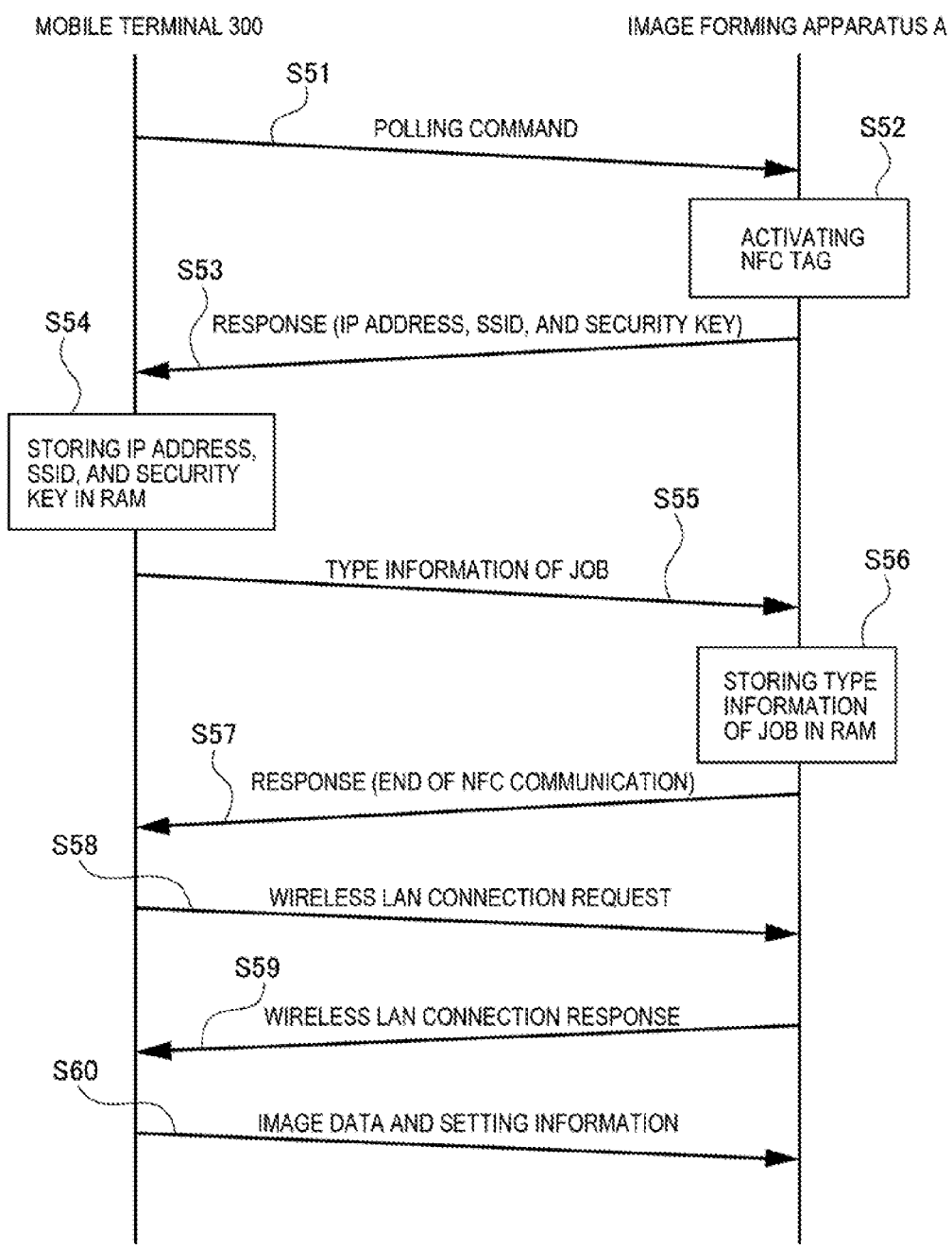
FIG. 8 is a diagram showing a flow of wireless communication between an image forming apparatus and a mobile terminal.

As shown in FIG. 8, when the NFC communication is started, first, the NFC reader/writer 307 of the mobile terminal 300 transmits a Polling command to the NFC tag 107 of the image forming apparatus A (step S51). As a result, the NFC tag 107 of the image forming apparatus A is activated by the radio wave generated by the mobile terminal 300 (step S52).

Next, the NFC tag 107 transmits as Response data to the NFC reader/writer 307 of the mobile terminal 300, the IP address, SSID, and security key, that are information for performing wireless LAN communication (step S53). The NFC reader/writer 307 stores these pieces of information in the RAM 302 (step S54).

Next, the NFC reader/writer 307 of the mobile terminal 300 transmits to the NFC tag 107 of the image forming apparatus A the type information of the job designated by the user on the MFP link application (step S55). The NFC tag 107 stores the type information of the job in the RAM 102 (step S56). After that, the NFC tag 107 transmits to the NFC reader/writer 307 of the mobile terminal 300, as Response data, data for ending the NFC communication process (step S57). As a result, the NFC communication is ended.

Next, the mobile terminal 300 issues a request to a wireless LAN communication connection request to the image forming apparatus A via the wireless LAN interface 306 using the IP address of the image forming apparatus A stored in the RAM 302 (step S58). On the other hand, the image forming apparatus A detects the connection request of the mobile terminal 300 by the wireless LAN interface 118 and performs the authentication process (step S59). As a result, wireless LAN communication is established between the image forming apparatus A and the mobile terminal 300.

Figure 7C:
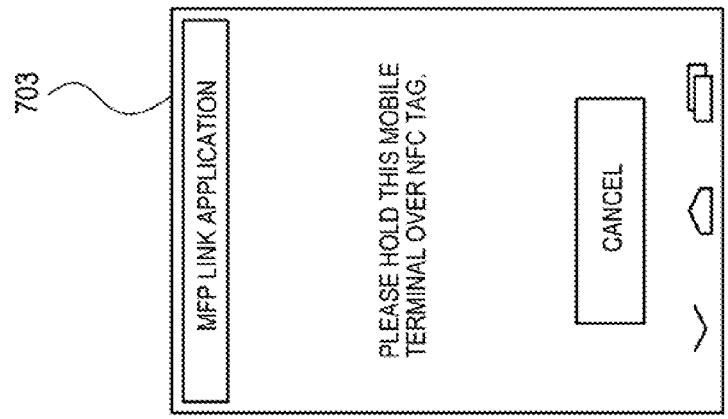
FIGS. 7A to 7F are diagrams showing display screens of MFP link application.
Figure 7B:
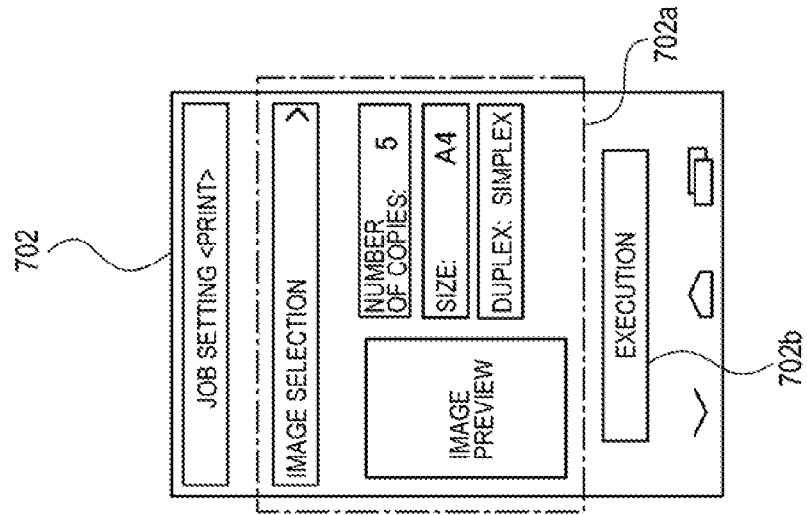
Figure 7A:
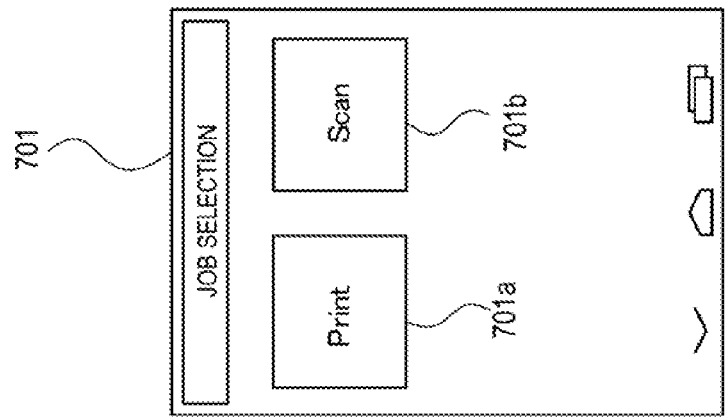
Figure 7D:
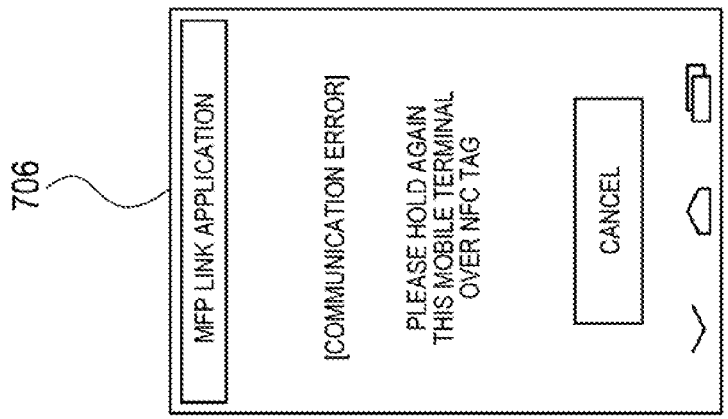
Figure 7E:
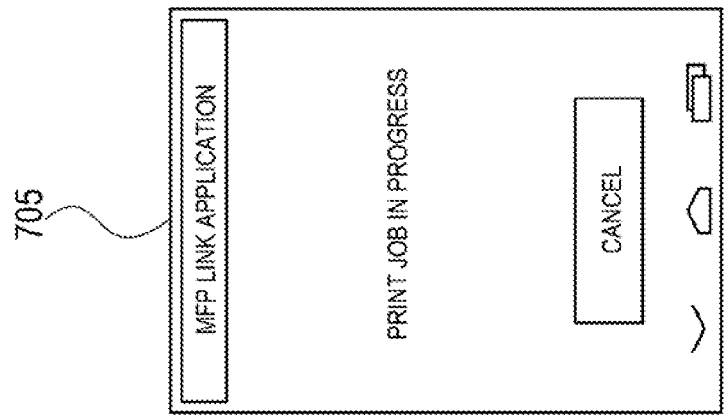
Figure 7F:
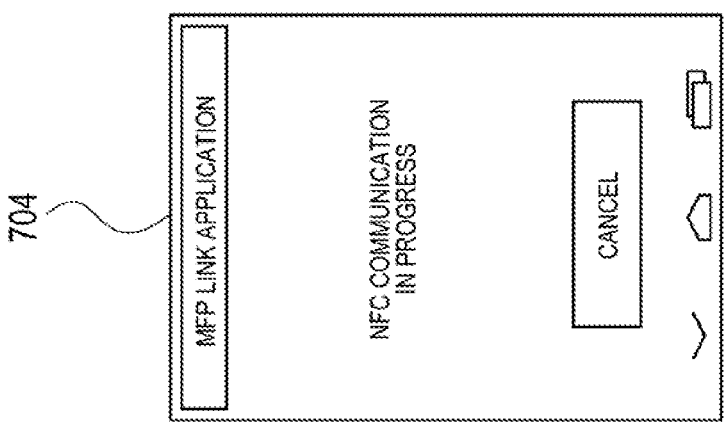

After that, the mobile terminal 300 transmits to the image forming apparatus A the data of the image and the setting data, such as the number of images to be formed that are selected on the job setting screen 702 shown in FIG. 7B. The image forming apparatus A executes a job based on the received image data and setting information.

In the present embodiment, the type information of a job is transmitted from the mobile terminal 300 to the image forming apparatus A by NFC communication. However, the present invention is not limited to this configuration. The job type information may be transmitted from the mobile terminal 300 to the image forming apparatus A by the wireless LAN communication after the wireless LAN communication is established by using the NFC communication.

<Return Sequence>

Next, a return sequence performed when the image forming apparatus A returns from the sleep mode will be described with reference to the flowchart shown in FIG. 9.

As shown in FIG. 9, when receiving a job signal via the network interface 106 or the wireless LAN interface 118 in the sleep mode, the CPU 101 returns the image forming apparatus A from the sleep mode as follows. The CPU 101 instructs the power supply controlling portion 170 to turn on/off the switches 171 to 177 according to the designated job type (steps S1 and S2). For example, when the image forming job is designated via the network interface 106 as described above, the CPU 101 instructs the power supply controlling portion 170 to turn on the switches 174 and 176. As the CPU 101 is supplied with power from the power supply apparatus 160 even in the sleep mode, the CPU 101 can instruct the power supply controlling portion 170 to turn on/off the switches. Thereafter, the CPU 101 ends the return sequence, and the image forming apparatus A performs the designated job.

Further, when a signal related to the user detection is input from the human detection sensor 180 in the sleep mode, the CPU 101 instructs the power supply controlling portion 170 to turn on the switches 171, 174, 175, and 176 (steps S3 and S4). That is, when a user is detected by the human detection sensor 180, the CPU 101 returns the image forming apparatus A from the sleep mode after all the switches 171 to 177 are turned on.

Next, when the type information of a job transmitted from the mobile terminal 300 of a user approaching the image forming apparatus A by NFC communication using the MFP link application is received and the job is designated, the CPU 101 performs the following steps. That is, the CPU 101 instructs the power controlling portion 170 to turn off the switches of the devices that are not used when the designated job is performed (steps S5 and S8). The CPU 101 gives the above instruction to the power supply controlling portion 170 at the timing when the type information of a job is received by the NFC communication, and stops the supply of power to the unused device by the job is started. Thereafter, the CPU 101 ends the return sequence, and the designated job is performed in the image forming apparatus A.

When a job is designated by a user detected by the human detection sensor 180 from the mobile terminal 300 via NFC communication, the CPU 101 performs the following steps. That is, the CPU 101 controls the power supply apparatus 160 via the power supply controlling portion 170 such that the power supply apparatus 160 continues to supply power to the devices (first devices) that are used when executing the designated job and stops the supply of power to the devices (second devices) that are not used when executing the designated job. As described above, even when a user is detected by the human detection sensor 180 and power is supplied to predetermined devices, power consumption can be suppressed by stopping the supply of power to the devices that are not used during the execution of the job.

For example, when the image forming job is designated via the NFC communication from the mobile terminal 300, the CPU 101 instructs the power supply controlling portion 170 to turn off the switches 171, 172, and 175. More specifically, the CPU 101 receives a signal regarding the designated job in response to the designation of a job from the mobile terminal 300 via the NFC communication. The CPU 101 instructs the power supply controlling portion 170 to turn on/off the respective switches based on this signal. As a result, the supply of power to the operation portion 9, the network interface 106, and the image reading unit 8, which are not used when executing the image forming job, is stopped. On the other hand, the image forming unit 4 used during execution of the image forming job continues to be supplied with electric power and the image forming apparatus A automatically starts the image formation on a sheet in response to the designation of the image forming job from the mobile terminal 300. Further, when an image reading job is designated via the NFC communication from the mobile terminal 300, the CPU 101 instructs the power supply controlling portion 170 to turn off the switches 171, 172, and 176. As a result, the supply of power to the operation portion 9, the network interface 106, and the image forming unit 4, which are not used during the execution of the image reading job, is stopped.

On the other hand, when the job is not designated from the mobile terminal 300 but by the operation portion 9, the CPU 101 instructs the power supply controlling portion 170 to turn off the devices that are not used when the designated job is executed (steps S6 and S8). For example, when a user sets a document on the image reading unit 8 and operates the operation portion 9 to designate a copy job, the CPU 101 instructs the power controlling portion 170 to turn off the switch 172. As a result, the power supply to the network interface 106 that is not used when executing the copy job is stopped. After that, the CPU 101 ends the return sequence, and the image forming apparatus A executes the job.

When a job is not designated from the mobile terminal 300 or the operation portion 9 and a predetermined time has elapsed since a user was detected by the human detection sensor 180, the CPU 101 performs the following steps. That is, the CPU 101 instructs the power supply controlling portion 170 to turn off the switches 171, 174, 175, and 176, and changes the current mode of the image forming apparatus A to the sleep mode again (steps S7 and S9). The above predetermined time is assumed to be the time required from the detection of a user by the human detection sensor 180 to the start of the NFC communication by the mobile terminal 300 being held over the NFC tag by a user. The CPU 101 then ends the return sequence.

In the present embodiment, NFC communication has been described as an example of short-range wireless communication performed by a user near the image forming apparatus A. However, the present invention is not limited to this configuration. The same effect as described above can be obtained even when the communication is performed by other types of short-range wireless communication such as Bluetooth (registered trademark).

Further, in the present embodiment, an ultrasonic sensor is used as the human detection sensor 180. However, the present invention is not limited to this configuration. It is sufficient that the human detection sensor 180 has a configuration capable of detecting a user approaching the image forming apparatus A, such as an infrared sensor.

Further, in the present embodiment, the image forming job and the image reading job are exemplified as the types of jobs for the image forming apparatus A designated from the mobile terminal 300 using the MFP link application. However, the present invention is not limited to this configuration and other types of job can be designated. Further, it is not always necessary to use the software application to designate from the mobile terminal 300 a job to be executed at the image forming apparatus A. The job may be designated by other means such as a browser.

In the present embodiment, the job is designated from the mobile terminal 300 via NFC communication. However, after the wireless LAN communication is established, the job may be designated via the wireless LAN communication.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2019-169171, filed Sep. 18, 2019, which is hereby incorporated by reference herein in its entirety.

What is claimed is:

1. An image forming apparatus configured to form an image on a recording medium based on a job input to the image forming apparatus, the image forming apparatus comprising:

an image forming unit configured to form an image on a sheet;

an image reading unit configured to read an image formed on a sheet;

a detecting unit configured to detect a user approaching the image forming apparatus;

a communication unit configured to be capable of receiving the job from a mobile terminal via short-range wireless communication;

a power supply configured to supply electric power to the image forming unit and the image reading unit; and a controlling unit configured to control the electric power supplied from the power supply to the image forming unit and the image reading unit, wherein the controlling unit changes a status of the image forming apparatus from a status in which the power supply does not supply electric power to the image forming unit and the image reading unit to a first status in which the power supply supplies electric power to the image forming unit and the image reading unit in accordance with detecting information of the user by the detecting unit, and wherein the controlling unit changes the status of the image forming apparatus to a second status in which the power supply continues supplying electric power to the image forming unit and stops supplying electric power to the image reading unit in accordance with a command to designate a print job for ordering the image forming unit to perform an image forming process received from the mobile terminal.

2. The image forming apparatus according to claim 1, wherein the short-range wireless communication is NFC communication.

3. The image forming apparatus according to claim 2, wherein the power supply supplies electric power to a plurality of devices involving the image forming unit and the image reading unit in the first status and the second status, wherein the number of the devices to be supplied with the electric power in the second status is smaller than the number in the first status.

4. The image forming apparatus according to claim 1, wherein the image forming unit automatically starts image formation on a sheet in response to the designation of the job from the mobile terminal via the NFC communication.

5. The image forming apparatus according to claim 1, wherein the image forming apparatus further comprises an operation unit that receives an operation by the user, wherein after changing the status of the image forming apparatus from the status in which the power supply does not supply electric power to the image forming unit and the image reading unit to the first status in which the power supply supplies electric power to the image forming unit and the image reading unit in accordance with detecting information of the user by the detecting unit, the status of the image forming apparatus changes to the second status in which the power supply continues supplying electric power to the image forming unit and stops supplying electric power to the image reading unit even though the print job for ordering the image forming unit to perform an image forming process is received from the operation unit and the print job is not received from the mobile terminal via short-range wireless communication.

6. An image forming apparatus configured to form an image on a recording medium based on a job input to the image forming apparatus, the image forming apparatus comprising:
- an image forming unit configured to form an image on a sheet;
- an image reading unit configured to read an image formed on a sheet;
- a detecting unit configured to detect a user approaching the image forming apparatus;
- a first communication unit configured to perform short-range wireless communication with a mobile terminal;
- a second communication unit configured to be capable of receiving the job from the mobile terminal via wireless LAN communication whose communicable range is wider than that of the short-range wireless communication;
- a power supply configured to supply electric power to the image forming unit and the image reading unit; and
- a controlling unit configured to control a power supply from the power supply to the image forming unit and the image reading unit,
- wherein the controlling unit changes a status of the image forming apparatus from a status in which the power supply does not supply electric power to the image forming unit and the image reading unit to a first status in which the power supply supplies electric power to the image forming unit and the image reading unit in accordance with detecting information of the user by the detecting unit,
- wherein information for performing the wireless LAN communication is transmitted to the mobile terminal in the short-range wireless communication between the mobile terminal and the first communication unit to enable the wireless LAN communication between the mobile terminal and the second communication unit, and
- wherein the controlling unit changes the status of the image forming apparatus to a second status in which the power supply continues supplying electric power to the image forming unit and stops supplying electric power to the image reading unit in accordance with a command to designate a print job for ordering the image forming unit to perform an image forming process received from the mobile terminal via the wireless LAN communication.

7. The image forming apparatus according to claim 6, wherein the short-range wireless communication is NFC communication.

8. The image forming apparatus according to claim 6, wherein the first communication unit and the mobile terminal communicate with each other for authentication of the user sheet.

9. The image forming apparatus according to claim 6, wherein the image forming unit automatically starts image formation on a sheet in response to the designation of the job from the mobile terminal via the NFC communication.

10. The image forming apparatus according to claim 6, wherein the power supply supplies electric power to a plurality of devices involving the image forming unit and the image reading unit in the first status and the second status, and
wherein the number of the devices to be supplied the electric power in the second status is smaller than the number in the first status.

11. The image forming apparatus according to claim 6, wherein the image forming apparatus further comprises an operation unit that receives an operation by the user,
wherein after changing the status of the image forming apparatus from the status in which the power supply does not supply electric power to the image forming unit and the image reading unit to the first status in which the power supply supplies electric power to the image forming unit and the image reading unit in accordance with detecting information of the user by the detecting unit, the status of the image forming apparatus changes to the second status in which the power supply continues supplying electric power to the image forming unit and stops supplying electric power to the image reading unit even though the print job for ordering the image forming unit to perform an image forming process is received from the operation unit and the print job is not received from the mobile terminal via the wireless LAN communication.

* * * * *